June 10, 1941.   H. F. MAYNES   2,244,889
FISHING REEL
Filed July 13, 1940
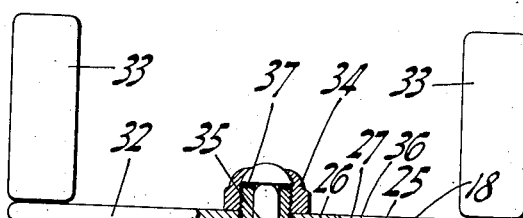
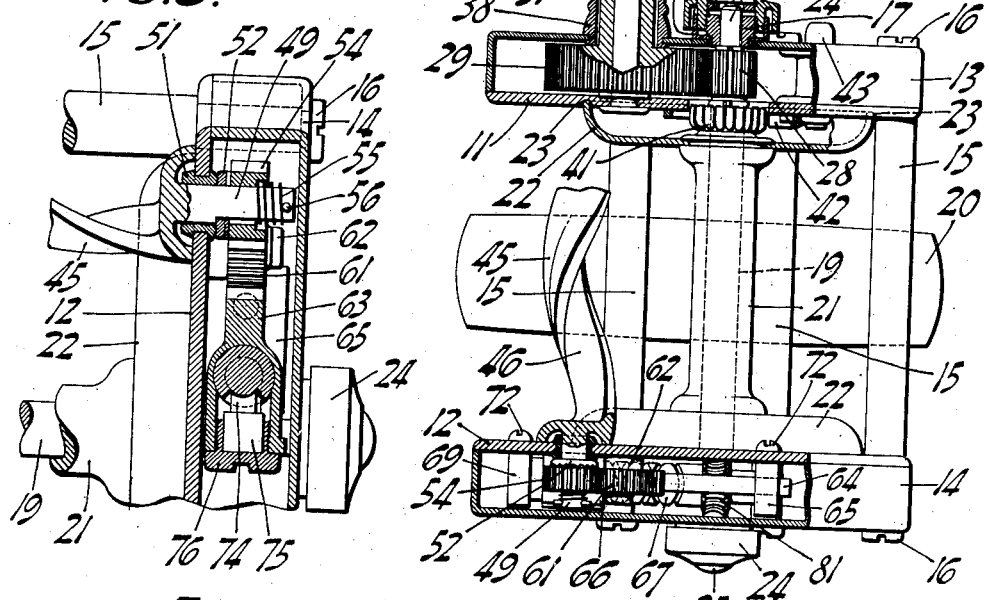
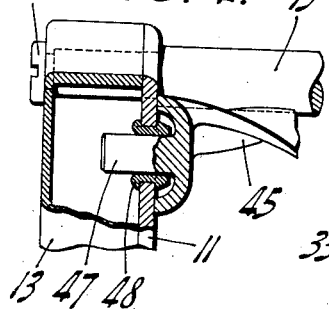
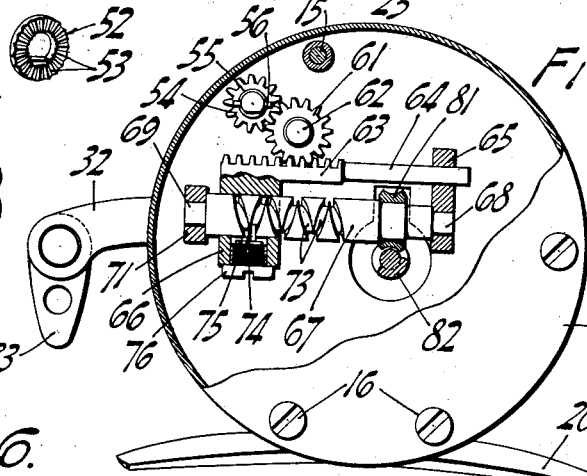
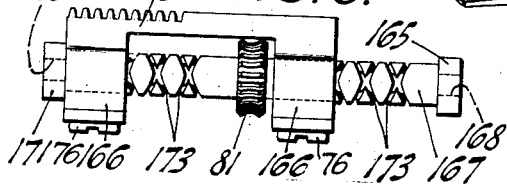
INVENTOR
HYLA F. MAYNES
BY
Beau, Brooks, Buckley & Beau
ATTORNEYS Patented June 10, 1941

2,244,889

UNITED STATES PATENT OFFICE 2,244,889

FISHING REEL

Hyla F. Maynes, North Tonawanda, N. Y., assignor of one-half to Emma C. Maynes, North Tonawanda, N. Y.

Application July 13, 1940, Serial No. 345,331

9 Claims. (Cl. 242—84.4)

This invention relates to fishing reels and it has particular relation to mechanism designed for operating level wind members of the fishing reels.

The invention contemplates a structure of simple and inexpensive manufacture wherein a reversely threaded screw, disposed in a plane substantially normal to the axis of the fishing line winding spool of the reel, and operated preferably through a worm and worm wheel from the winding spool, is employed to effect reciprocation of means, such as a rack, which in turn will operate the level wind member. By this arrangement of parts the level wind operating means may be compactly arranged in one end member of the fishing reel frame.

Means are also contemplated whereby the level wind member may be moved, with respect to the drive means therefor, without disassembly of the parts, so that the level wind means may be adjusted into proper phase relation with the spool to distribute the fishing line evenly upon the winding spool when the latter is rotated. The means providing for such adjustment may comprise resiliently engaging detent means connecting the level wind member to the drive means therefor. The worm and worm wheel drive, previously mentioned, cooperates with the detent means during such adjustment by holding the drive means stationary while the level wind member is moved manually into the desired phase relation with the drive means.

These and other objects and advantages will become apparent from the following description of the typical embodiment of the invention shown in the accompanying drawing, wherein:

Fig. 1 is a plan view of the reel with portions thereof broken away and appearing in section;

Fig. 2 is an end elevational view, with parts broken away to reveal the level wind drive means;

Fig. 3 is a fragmentary vertical sectional view through the portion of the reel having the level wind drive means;

Fig. 4 is a fragmentary vertical sectional view of the opposite portion of the reel;

Fig. 5 is a perspective view of one of the detent members; and,

Fig. 6 is an elevational view of a modified drive structure.

As shown in the drawing the frame of the reel may comprise end members consisting of plates 11 and 12, and cup shaped closure members 13 and 14, respectively, secured to the plates; and further may comprise posts 15 which hold the end members in spaced relation, the frame assembly being secured by screws 16 threaded into the posts. Affixed to the lower posts 15 is a saddle 20 by which the reel may be attached to a fishing rod.

Secured to members 13 and 14 are bearings 17 receiving the journal portions 18 of shaft 19 at each end of the latter. Upon shaft 19 is secured a fishing line winding spool 21. The latter has outwardly cupped end flanges 22 whose peripheral portions extend into annular grooves 23. Screw threaded to the bearing members 17, and hence adjustable axially of the shaft 19, are cap nuts 24, having thrust bearings 25 engaging the shaft ends. Washers 26 having resilient fingers 27 engaging annular grooves in the cap nuts 24 prevent the latter from accidentally loosening. A lubricant retaining felt 36 is preferably disposed within each cap nut 24.

Upon the end of spool shaft 19 within frame end member 11, 13 is a pinion 28 meshing with a drive gear 29. The latter has a sleeve-like extension 31 to which a winding crank handle 32, 33 is secured by a cap nut 34, the gear and its extension being rotatably mounted on a stub shaft 35 extended from end plate 11. A felt washer 37 may be provided in the cap nut for retaining lubricant for the gear and stub shaft, and a sleeve 38 secured to and extended outwardly from the closure 13 protects the assembly from ingress of foreign matter.

Carried by the winding spool and located in the space between plate 11 and the adjacent cupped flange 22 of the spool is a serrated wheel 41 adapted to be engaged by a clicker 42, the clicker being movable into or out of engagement with wheel 41 by a finger piece 43. In general, the clicker arrangement is similar to that shown in my Patent No. 2,027,305, granted January 7, 1936.

For distributing fishing line evenly as it is being wound upon the spool 21, there is provided a spiral wind shaft 45, having a spiral trough 46 whose depressed portion, in effect, oscillates from side to side of the reel when the shaft 45 is oscillated angularly about its axis, that is, when the shaft 45 is rotated somewhat over one-half turn in each direction and then reversed.

The axis of the shaft 45 is preferably substantially parallel to the axis of the winding spool, one end of the shaft, 47, being journaled in a bearing 48 carried by end plate 11, as shown in Fig. 4, and the other end, 49, being journaled in a similar bearing 51 carried by end plate 12. The outer extremity of shaft end 49 is non-circular in cross-section, preferably of D shape, and keyed thereon is a detent member 52 whose outer face is provided with shallow serrations 53. Mounted for rotation upon the shaft end 49, outwardly of member 52, is a pinion 54 whose inner face is provided with serrations complementary to serrations 53, and a spring 55, backed by a pin 56, for urging the pinion axially of the shaft into engagement with member 52.

Meshing with pinion 54 is a pinion 61 rotatably mounted upon a stub shaft 62 that is carried by end plate 12. Pinion 61 is in mesh engagement with a rack 63 which has an end extension 64 slidably supported by a bearing block 65, and a depending extension 66 slidably supported upon the outer cylindrical surface of a screw 67 whose axis of rotation is parallel to extension 64. The screw 67 has end journal portions 68 and 69 receiving bearing support respectively from the bearing block 65 and another bearing block 71. The bearing blocks are joined to the plate 12 in any suitable manner, such as by fasteners 72 shown in Fig. 1.

Screws 67 is reversely threaded, that is, is provided with oppositely extending grooves 73 crossing one another at points between the ends thereof, and merging into each other at their ends. A rider 74 having an end portion 75 pivotally mounted in a cap screw 76 secured to rack extension 66, engages the screw in such manner that as the latter rotates about its axis, the rider will travel along the threaded portion of the screw, carrying with it the rack. The pivot connection 74, 75 allows the rider to reverse its inclination to correspond to the screw pitch whenever it reaches the end of either groove 73 and enters the oppositely directed groove. Secured upon the screw is a worm wheel 81 meshing with a worm 82 that is formed on a portion of the spool shaft 19 that is disposed within the chamber between plate 12 and closure 14.

In operation, as the handle 32, 33 is turned, counter-clockwise in Fig. 2, a fishing line extended over level wind shaft 45 may be wound on spool 21, the latter being rotated in a clockwise direction by gear 29 and pinion 28. The worm 82 and worm wheel 81 will simultaneously rotate the reversely threaded screw 67, effecting reciprocation of the rack 63, and angular oscillation of the pinions 61 and 54, so that the level wind shaft 45 will be angularly oscillated about its axis, reversing its direction of rotation after making a part of a turn in each direction. This action will shift the fishing line, which rides in the trough 46 of the level wind shaft, alternately from side to side of the reel, distributing it evenly upon the winding spool.

It will be understood that the angular oscillation of the level wind shaft will be in predetermined synchronized relation to rotation of the winding spool, by reason of the drive means whose operation has just been described. However, after initial assembly, or after any reassembly of the parts, the level wind shaft may not be in the desired phase relation to the drive means.

This may be corrected, without disassembly of any of the parts of the reel, by merely grasping the level wind shaft and turning it about its axis into the desired position. During this action the worm 82 will hold the worm wheel 81, and hence the screw 67, rack 63, and pinions 61 and 54, against movement, while the resilient detent means, including spring 55 and the cooperating serrated faces of pinion 54 and detent member 52, will permit turning movement of the spiral wind shaft with respect to the pinion 54. When once moved into properly adjusted position, the spring 55 will act to prevent accidental displacement of the level wind shaft relative to its drive means.

It will be understood further that the arrangement of the parts, with the axis of the reversely threaded screw and the rack disposed in a plane or planes substantially normal to the axes of shafts 19 and 45, provides a compact grouping of the parts, and permits simple and facile assembly thereof. The parts themselves are also susceptible of relatively simple and inexpensive manufacture, so that the total cost of production of the reel is materially less than for reels of this general type which have been made previously hereto.

In the modified construction illustrated in Fig. 6, the general arrangement of parts, except for the reversely threaded screw and rack, may be substantially as described hereinbefore. In the modified form, the screw 167 has its ends 168 and 169 journaled in bearing blocks 165 and 171, respectively, and the worm wheel 81 is secured upon the screw at a point between two sets of reversely or oppositely inclined pairs of screw threads 173. The rack bar, 163, adapted for meshing engagement with pinion 61, is provided with two depending projections 166, each of which supports a cap screw 76 pivotally supporting a rider 74 engaging in one of the sets of screw threads 173. This arrangement eliminates the necessity for a part similar to extension 64 in the first described embodiment. The rack is held against rotation about the axis of the reversely threaded screw by the pinion which it drives and also by its confinement between the parallel faces of plates 12 and closure 14, these faces preferably being spaced a distance only slightly greater than the width of extensions 166.

By this arrangement, which employs two riders 74 engaging the double threaded screw, the load and hence the wear upon the riders and each set of screw threads is substantially reduced, increasing the useful life of the device. The arrangement is of particular value in the case of fishing reels intended to handle relatively heavy fishing line, and where, in general, heavier loads may be imposed on the level wind mechanism.

It will be understood that the reel structures herein shown and described are merely illustrative of the inventive principles involved, and that these principles may be otherwise embodied without departing from the spirit of the invention or the scope of the appended claims.

What is claimed is:

1. In a fishing reel, a frame and a spool mounted thereon for winding a fishing line, a level wind shaft mounted on the frame for shifting the line alternately from end to end of the spool, means operatively connected to the spool for driving the level wind shaft in synchronized relation with the spool, and resilient detent means effective between the level wind shaft and its drive means for enabling manual movement of the level wind shaft relative to the driving means, to provide for adjustment of the level wind shaft and the driving means into proper phase relation.

2. In a fishing reel, a frame and a spool mounted thereon for winding a fishing reel, a level wind shaft mounted on the frame with its axis in substantially parallel relation to the axis of the spool, means operatively connected to the spool for oscillating the level wind shaft about its axis in synchronized relation with rotation of the spool for shifting the line alternately from end to end of the spool, and resilient detent means associated with the means for oscillating the level wind shaft, said resilient detent means enabling manual movement of the level wind shaft angularly about its axis relative to the oscillating means, to provide for adjustment of the level wind shaft and the oscillating means into proper phase relation.

3. In a fishing reel, a frame and a spool thereon for winding a fishing line, a level wind shaft mounted on the frame for shifting the line alternately from end to end of the spool, means operatively connected to the spool for driving the level wind shaft in synchronized relation with the spool, said means including a drive element and a driven element having a common axis and having cooperating detent means engageable in driving relation to each other when said elements are in any of a plurality of relative angular positions about said common axis, and resilient means associated with said elements for normally holding them in driving relation.

4. In a fishing reel, a frame and a spool thereon for winding a fishing line, a level wind shaft mounted on the frame for shifting the line alternately from end to end of the spool, means operatively connected to the spool for driving the level wind shaft in synchronized relation with the spool, said means including a driven element rotatable with the shaft and a drive element coaxial therewith, and resilient means for normally retaining said elements in a driving relationship but permitting the level wind shaft and the drive element to be relatively moved angularly about the axis of the level wind shaft, to provide for adjustment of the level wind shaft into proper phase relation with the driving means therefor.

5. In a fishing reel, a frame comprising a pair of end members and a winding spool mounted therebetween, the spool including a shaft journaled in said end members, a level wind shaft journaled in said end members and having its axis disposed in substantially parallel relation to the axis of the spool shaft, means carried by one end member for driving the spool shaft, and means carried by the other end member for driving the level wind shaft, the last mentioned means comprising a rack reciprocated in a plane substantially normal to the shaft axes and a pinion engaged by the rack and operatively connected to the level wind shaft, a reversely threaded screw rotatable for reciprocating said rack, and means connecting the screw to the spool shaft for rotation thereby.

6. In a fishing reel, a frame comprising a pair of end members and a winding spool mounted therebetween, a level wind shaft journaled in said end members and having its axis disposed in substantially parallel relation to the axis of the spool, a reversely threaded screw, means reciprocated by the screw upon rotation thereof for angularly oscillating said level wind shaft about the axis of the latter upon rotation of the screw, and means for rotating the screw upon rotation of the spool.

7. In a fishing reel, a frame and a spool mounted thereon for winding fishing line; a level wind shaft mounted on the frame for shifting the line alternately from end to end of the spool; drive means operatively connected with the spool for driving the level wind shaft in synchronized relation with the spool, said drive means comprising a worm rotatable upon rotation of the spool, a reversely threaded screw having a worm wheel engaging said worm for being rotated thereby, and means reciprocated by said reversely threaded screw upon rotation thereof for imparting to the level wind shaft an angular oscillatory movement; and resilient detent means effective between said means reciprocated by the screw and the level wind shaft for enabling manual movement of the latter relative to said drive means, the worm and worm wheel cooperating to hold the drive means stationary when the level wind shaft is moved manually.

8. In a fishing reel, a frame, a winding spool and a level wind shaft mounted on the frame upon substantially parallel axes for rotation and angular oscillation, respectively, a screw having its axis of rotation in a plane substantially normal to said substantially parallel axes, said screw having a pair of reversely threaded portions and a worm wheel on the screw between said portions, a worm rotated by the spool and meshing with said worm wheel for rotating the screw, a member mounted for reciprocation axially of said screw and having a rider engaging each of said reversely threaded portions for being reciprocated thereby as the screw is rotated, and means for imparting motion from said member to said level wind shaft.

9. In a fishing reel, a frame, a winding spool and a level wind shaft mounted on the frame upon substantially parallel axes for rotation and angular oscillation, respectively, a worm rotatable upon rotation of the spool, a double threaded screw having its axis of rotation in a plane substantially normal to said substantially parallel axes and having thereon a worm wheel engaging said worm for rotation thereby, and means reciprocated by said double threaded screw upon rotation thereof for imparting to the level wind shaft an angularly oscillatory movement.

HYLA F. MAYNES.